(No Model.) 3 Sheets—Sheet 1.
G. W. AMESBURY.
DEVICE FOR SHARPENING SAWS.
No. 378,277. Patented Feb. 21, 1888.
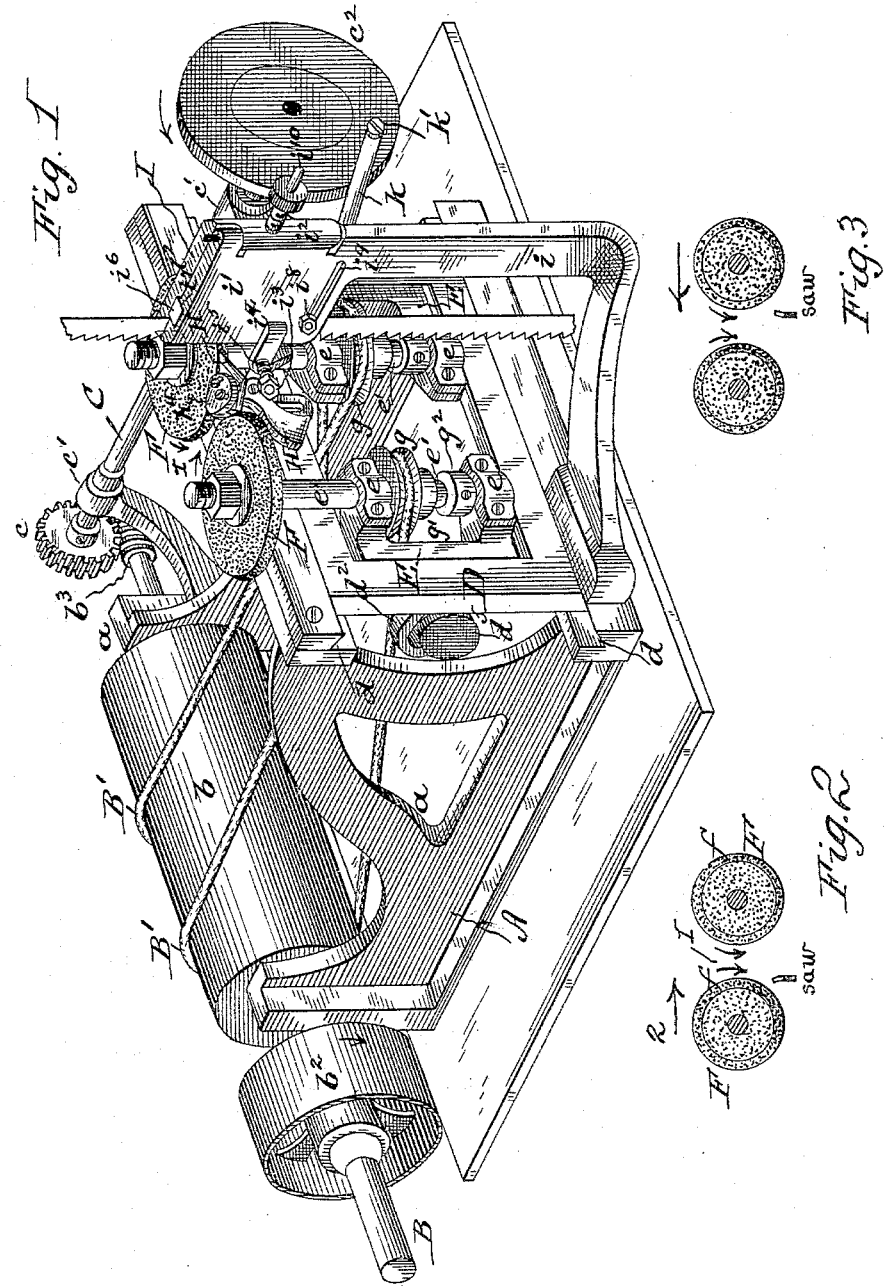
WITNESSES:
INVENTOR,
Geo. W. Amesbury
By S. J. Van Stavoren
ATTORNEY, (No Model.) 3 Sheets—Sheet 2.
G. W. AMESBURY.
DEVICE FOR SHARPENING SAWS.
No. 378,277. Patented Feb. 21, 1888.
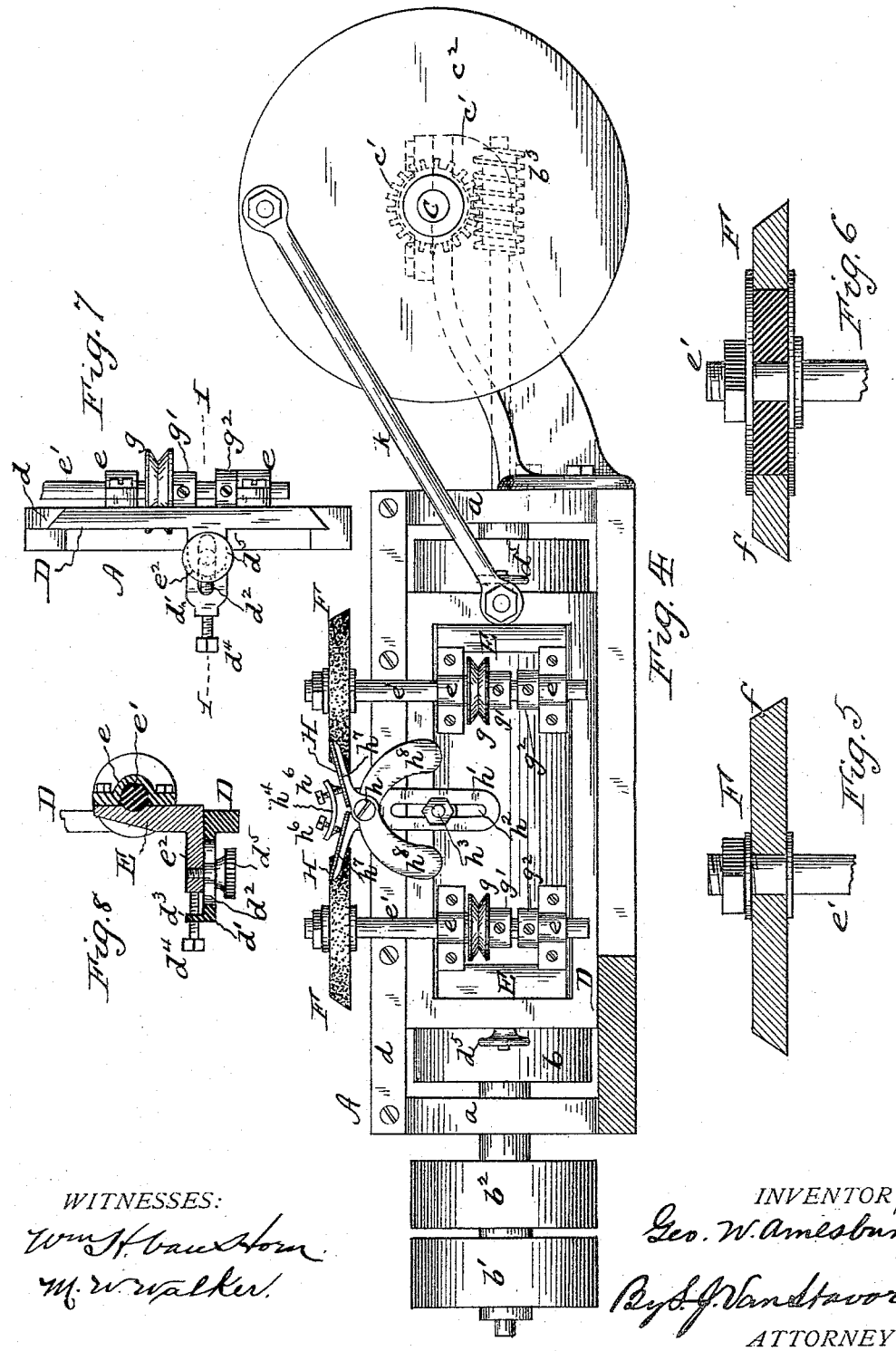
WITNESSES:
INVENTOR,
Geo. W. Amesbury.
By S. J. Vandtavoren
ATTORNEY.

(No Model.) 3 Sheets—Sheet 3.
G. W. AMESBURY.
DEVICE FOR SHARPENING SAWS.
No. 378,277. Patented Feb. 21, 1888.
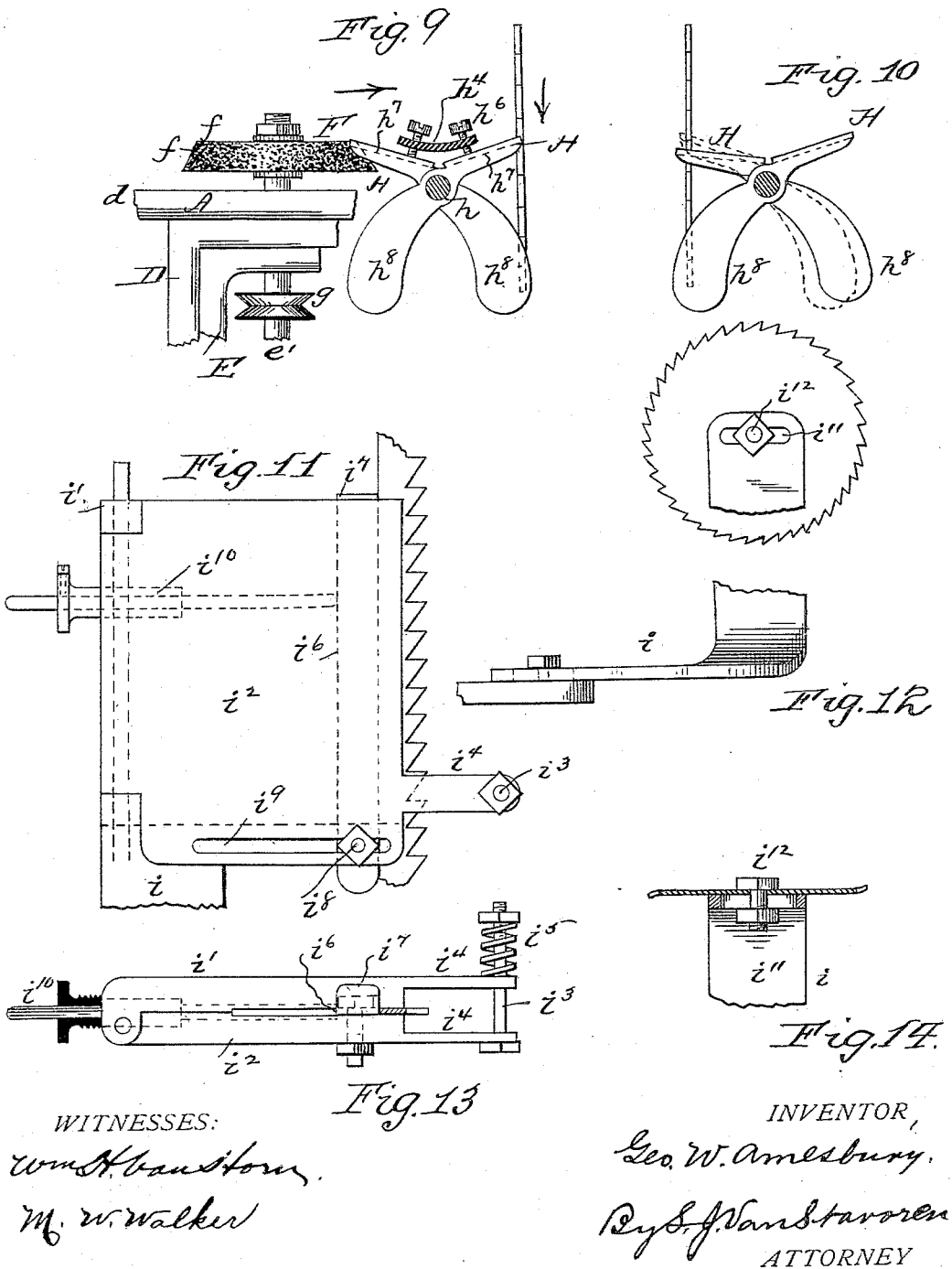

UNITED STATES PATENT OFFICE.

GEORGE W. AMESBURY, OF PHILADELPHIA, PENNSYLVANIA; GEORGE M. BRILL ADMINISTRATOR OF SAID GEORGE W. AMESBURY, DECEASED.

DEVICE FOR SHARPENING SAWS.

SPECIFICATION forming part of Letters Patent No. 378,277, dated February 21, 1888.

Application filed May 5, 1886. Serial No. 201,206. (No model.)

*To all whom it may concern:*

Be it known that I, GEORGE W. AMESBURY, a citizen of the United States, residing at Philadelphia, in the county of Philadelphia and State of Pennsylvania, have invented certain new and useful Improvements in Saw-Sharpeners, of which the following is a specification, reference being had therein to the accompanying drawings.

My invention has relation to saw-sharpeners; and it has for its object to provide a simple, durable, effective, and quick-acting saw-sharpener wherein the saw-teeth are sharpened by revolving disks, preferably of emery or analogous material, which disks sharpen the saw-teeth in the direction of their set, there being preferably a pair of disks, and each one is arranged for operation to sharpen alternate teeth, and which within their limit of size are susceptible of being used for any kind and any size of saw, but are especially adapted to band, jig, or like saws.

My invention accordingly consists of the combination, construction, and arrangement of parts, as hereinafter described and claimed, having reference particularly to rotary sharpening-disks made of emery or analogous material, to rotary disks supported in a reciprocating frame, to rotary disks supported in brackets having a pivoted or tilting connection with adjusting mechanism in a reciprocating frame, and to an automatic feed secured to and moving with the reciprocating frame.

In the drawings, which illustrate a saw-sharpener embodying my improvements, Figure 1 represents a perspective view of same. Figs. 2 and 3 are diagrams showing direction of reciprocation and rotation of the sharpening-disks for sharpening alternate saw-teeth in the direction of their set. Fig. 4 is a front view, partly sectional. Figs. 5 and 6 are sectional views of different constructions of emery or sharpening wheels and manner of securing them to their shafts or spindles. Fig. 7 is a detail end elevation showing pivoted or tilting bracket and adjusting mechanism for shaft or spindle of rotary disk, reciprocating frame, and part of main frame of the machine. Fig. 8 is a section on line 1 1, Fig. 7. Figs. 9 and 10 are detail elevations showing different positions of automatic feed devices. Fig. 11 is an elevation, partly broken away, of saw holder or clamp. Fig. 12 is a plan of same, partly sectional. Fig. 13 is a modified form of holder for circular saw; and Fig. 14 is a plan of same, partly sectional.

A indicates the frame of the machine, which may be made as shown or otherwise, as desired. To preferably the rear end of the frame is mounted a power or driving shaft, B, which may have either fixed or sliding bearings as desired, and is preferably provided with a drum, $b$, between the sides $a$ $a$ of frame A, and has at one end loose and fixed pulleys $b'$ $b^2$, (see Fig. 4,) and at the other a worm, $b^3$, which gears with a worm-wheel, $c$, upon a side shaft, C, having suitable bearings, $c'$ $c'$, and an end disk or crank, $c^2$, which is approximately in line with the front of the frame A. The latter is provided with top and bottom guides or ways, $d$, in which is fitted to slide therein a frame, D. The guides $d$ may be of any suitable construction, and the parts or top and bottom edges of frame D sliding therein are correspondingly formed to fit the guides.

To frame D are secured yokes or brackets E, having bearings $e$ for spindles or shafts $e'$, which carry the sharpening-disks F. These brackets E may be secured to the frame D, as desired, or they may be a part of same; but I prefer to attach them to the frame so that they may be adjusted from a vertical to an angular or inclined position for the purpose of altering the plane of the sharpening-disks or to give them and their sharpening-edges an inclination to fit the different forms or shapes of saw-teeth, and thereby avoiding the necessity of having different sharpening-wheels for different forms and sizes of teeth. To do this I preferably form or secure lugs $d'$ upon the rear side of frame D, near each end. (See more plainly Figs. 7 and 8.) In lugs $d'$ are elongated slots $d^2$, and at their rear ends are lips $d^3$, through which pass set-screws $d^4$, the forward ends of which impinge against the back of lugs $e^2$, cast on brackets E. Through slots $d^2$ in lugs $d'$ pass thumb or adjusting screws $d^5$, which fasten the brackets E to frame D, and when loosened admit of turning or tilting the brackets and of adjusting them forwardly and backwardly by the movement of the set-screws $d^5$ along slots $d^2$, thereby either altering or inclining the plane of disks F or moving the disks or their edges to and from the saw-holder, if desired. The set-screws $d^4$ are suitably manipulated to admit of said adjustments.

The spindles or shafts are preferably, and as shown, vertically located, and have grooved driving-wheels $g$, with collar $g'$ and set-screw, so that the wheels may be adjusted up and down on the spindle, and the latter have step or stop collars $g^2$, with set-screws to admit of raising or lowering the spindles or shafts in bearings $e\ e$ to adjust the height of the disks F, which project, preferably, above the top of frame A, as shown, and are parallel with each other.

Between the disks, and attached to the top of the front side of frame D, are the automatic feed bars or pawls H, which are pivoted, by a screw, $h$, or otherwise, as desired, to a bracket, $h'$, having at its lower end an elongated slot, $h^2$, through which passes a set-screw, $h^3$, which secures the bracket $h'$ and bars H to the frame D, or to a lug thereon, and provides for raising and lowering said bracket $h'$ to adjust the height of bars H in relation to the disks or their grinding-edges.

At the top of lug or bracket $h'$ is a forwardly-projecting lip, $h^4$, having set or stop screws $h^6$, one for each bar H, and which pass through the lip and abut against the upper sides of the limbs $h^7$ of feed-bars H. These limbs $h^7$ are shown as preferably diverging from one another in opposite directions from their pivotal connection, and their ends $h^8$ cross one another to form weights or gravity devices for holding the limbs $h^7$ up against the set or stop screws $h^6$. By adjusting the latter the inclination of the limbs $h^7$ may be varied as desired for feeding different sizes of teeth.

The feed arms or pawls H are, as shown, so arranged that pressure applied to the under side of limbs $h^7$ does not affect their position; but when applied to the upper side of said limbs the arms are tilted or oscillated on their pivotal points, as shown by dotted lines, Fig. 10, so that the bar that is not feeding is free to tilt as it passes across the back of a tooth.

The saw-holder I is suitably secured to the frame A, and consists, essentially, of an L-shaped bracket or arm, $i$, having a fixed jaw, $i'$, and a movable jaw, $i^2$, hinged to the former. Both said jaws form a holder or clamp, the closing pressure of which is regulated by an adjusting-screw, $i^3$, in lugs $i^4$, formed on or secured to the ends of the jaws next to the sharpening-disks, and having a pressure-spring, $i^5$, which acts to close the jaws. Between the latter is a thin loose plate, strip, or block, $i^6$, having a bent or turned-down upper end, $i^7$. The lower end of the block or plate engages with a bolt, $i^8$, working in a slot, $i^9$, in the fixed jaw, to fix or adjust the strip in any desired position within the limits of slot $i^9$ to suit different widths of saws. By adjusting screw $i^3$ the closing pressure of the jaws of the holder or clamp is varied as desired to accommodate saws of different thicknesses. A suitable screw thimble and rod, $i^{10}$, screws into the movable jaw and abuts against the front edge of strip $i^6$, to maintain it in its adjusted position. (See Fig. 13.) This form of holder or clamp is preferably used for band, jig, and like saws; but for circular saws the holder consists merely of a fixed jaw or plate, $i$, provided with a slot, $i^{11}$, near its upper end, for the reception of a bolt, pin, or shaft, $i^{12}$, upon which the saw is loosely mounted for sharpening, as illustrated in Fig. 12; or any other desired form of saw holder or clamp may be used, as the construction of the same is not an essential part of my invention.

The grooved pulleys $g$ on disk-shafts $e'$ are connected to drum or shaft $b$ by belting B', arranged to cause the disks or their spindles to revolve preferably in opposite directions, as indicated by the arrows 1, Fig. 1. These disks may be circular files of any suitable or desired kind, or other sharpening or abrading disks may be used; but on account of economy in construction, effectiveness of sharpening, durability, and low expense of replacing the disks I prefer to make them of emery, having beveled or other suitably-configured sharpening-faces $f$, as shown, which disks are either solid with central shaft-hole, as shown in Figs. 1 and 5, or are in the form of an annular ring, as indicated in Fig. 6, either of which is secured to its spindle in any desired or suitable manner.

When shaft C is provided with the end disk or wheel, $c^2$, the frame D is in gear therewith by a link, $k$, which has an eccentric connection, $k'$, with wheel $c^2$, as shown. If a crank is substituted for the wheel $c^2$, one end of the link $k$ is connected to the outer end of the crank in the usual manner. The effect of the foregoing-described construction is that as the disks F are rotated in opposite directions by shaft $b$ the shaft C, through the medium of link $k$, reciprocates frame D.

The foregoing-described construction, it will be noted, provides a pair of sharpening-disks which revolve in opposite directions, and inclined feed-bars, one for each disk, located between the disks, both disks and feed-bars being attached to a reciprocating frame for moving the disks and feed-bars to and fro across the saw-teeth. As the frame F reciprocates, the under edge of the feed-bar farthest from the disk, advancing to the saw, engages with the face of the first tooth or the one previously sharpened, and acts to feed the saw downward to bring the next tooth above in line with the advancing disk to cause each disk to sharpen alternate teeth of the saw. As the disks rotate in opposite directions, they sharpen or grind the teeth in the direction of their set. This result is plainly indicated in Figs. 2 and 3, of which Fig. 2 represents the disks as reciprocating in the direction of arrow 2 and the disk to the left advancing to the saw-tooth which has a set in the direction of rotation of said disk, and Fig. 3 represents the disks moving or reciprocating in an opposite direction and the disk to the right advancing to the saw-tooth which has an opposite set and in the direction of the rotation of the disk.

As the belting or gear-connection for rotating disks F may be arranged to variously rotate the disks according to the character of the grind desired, I do not limit myself to any one arrangement of same.

What I claim is—

1. In a saw-sharpener, a reciprocating frame, D, a pair of grinding-disks placed edge to edge and mounted on said frame, actuating mechanisms for said frame and disks to cause them to operate to sharpen alternate teeth of a saw, and a feeding device for the saw, substantially as set forth.

2. In a saw-sharpener, the combination of reciprocating frame D, rotary disks F, mounted on said frame and placed edge to edge, feed-bars H, saw holder or clamp L, and actuating devices for said frame, disks, and feed-bars, substantially as set forth.

3. The combination, with a saw-holder, of the reciprocating frame D, rotary grinding-disk F, mounted on said frame, and actuating devices, substantially as set forth.

4. In a saw-sharpener, the combination of the reciprocating frame, rotary grinding-disks mounted on said frame, saw-feeding bars, saw-holder, devices for actuating the disks and feeding-bars, and devices for adjusting the disks to and from the saw-feeding bars and for varying the inclination of the disks and for moving them to and from the saw-holder, substantially as set forth.

5. The combination of a reciprocating frame, brackets or yokes in said frame, rotary grinding or sharpening disks in said brackets, and actuating devices for said frame and disks, substantially as set forth.

6. In a saw-sharpener, the combination of reciprocating frame D, rotary grinding-disks F, mounted upon said frame and revolving in opposite directions, and actuating devices, substantially as set forth.

7. In a saw-sharpener, the combination of a reciprocating frame, D, rotary disks F, mounted on said frame, and actuating mechanism for the frame and disks, substantially as and for the purpose set forth.

8. In combination with drum-shaft B, sliding frame D, rotary disks F in said frame, actuating mechanism for the latter, and power-transmitting devices between shaft B and disks F, substantially as set forth.

9. The combination of a saw-holder, a feeding device consisting of inclined bars, sharpening-disks, and actuating devices for rotating and reciprocating said disks, substantially as set forth.

10. In a saw-sharpener, the combination of the sliding frame D, pivoted or tilting and sliding brackets or yokes E, and grinding-disks F, supported in said yokes, and actuating devices for said frame, yokes, and disks, substantially as set forth.

11. In a saw-sharpener, the combination of a reciprocating frame, D, rotary grinding-disks F, mounted upon said frame, a saw-holder composed of two jaws having spring closing devices, a sliding block located between the jaws, a feeding device, and actuating mechanism for the frame, disks, and feeding device, substantially as set forth.

12. The pivoted inclined feed-bars H, in combination with adjustable bracket $h'$, having stop-screws $h^6$ for the feed-bars, substantially as and for the purpose set forth.

13. In combination with frame D, having lugs $d'$, with slot $d^2$ and lip $d^3$, brackets or yokes E, having bearings $e$ and lugs $e^2$, and set-screws $d^4$ and $d^5$, substantially as and for the purpose set forth.

14. In a saw-sharpener, the combination of a reciprocating frame, a pair of oppositely-inclined feed-bars pivoted to said frame, rotary grinding-disks mounted on said frame, and actuating devices for the frame and disks, substantially as set forth.

In testimony whereof I affix my signature in presence of two witnesses.

GEORGE W. AMESBURY.

Witnesses:
S. J. VAN STAVOREN,
CHAS. F. VAN HORN.